United States Patent
Cote et al.

(10) Patent No.: US 8,031,721 B2
(45) Date of Patent: Oct. 4, 2011

(54) METHOD AND APPARATUS FOR MARKING AND SCHEDULING PACKETS FOR TRANSMISSION

(75) Inventors: Joseph Roy Cote, Carleton Place (CA); Nirmesh Patel, Kanata (CA)

(73) Assignee: Alcatel Lucent, Paris (FR)

( * ) Notice: Subject to any disclaimer, the term of this patent is extended or adjusted under 35 U.S.C. 154(b) by 212 days.

(21) Appl. No.: 12/029,667

(22) Filed: Feb. 12, 2008

(65) Prior Publication Data

US 2009/0201942 A1 Aug. 13, 2009

(51) Int. Cl.
*H04L 12/28* (2006.01)

(52) U.S. Cl. ............. 370/395.42; 370/231; 370/235; 370/468; 709/232

(58) Field of Classification Search .......... 370/389, 370/235, 412, 395.42, 231, 468; 709/232
See application file for complete search history.

(56) References Cited

U.S. PATENT DOCUMENTS

| 7,418,000 | B2* | 8/2008 | Bruckman et al. | 370/412 |
| 7,640,355 | B1* | 12/2009 | Marshall et al. | 709/232 |
| 2003/0233503 | A1* | 12/2003 | Yang et al. | 710/100 |
| 2004/0015599 | A1* | 1/2004 | Trinh et al. | 709/232 |
| 2005/0286488 | A1 | 12/2005 | Briscoe et al. | |
| 2008/0212473 | A1* | 9/2008 | Sankey et al. | 370/235 |

FOREIGN PATENT DOCUMENTS

| EP | 0 886 405 A2 | 12/1998 |
| WO | WO 99/66676 | 12/1999 |

* cited by examiner

*Primary Examiner* — Dang Ton
*Assistant Examiner* — Mandish Randhawa
(74) *Attorney, Agent, or Firm* — Wall & Tong, LLP

(57) ABSTRACT

A method and system for profile-marking and scheduling of packets are disclosed. Using a dual-rate scheduler, the profile state of a packet being scheduled for transmission by a flow traffic descriptor is determined based on the traffic rate of the flow traffic descriptor, which is associated with the queue that the packet belongs to. The profile state of the packet is marked prior to the transmission of the packet.

19 Claims, 3 Drawing Sheets

METHOD AND APPARATUS FOR MARKING AND SCHEDULING PACKETS FOR TRANSMISSION

FIELD OF THE INVENTION

The present invention generally relates to a method and apparatus for marking and scheduling packets for transmission.

BACKGROUND

In traffic management systems of packet switches, packet schedulers often dedicate a committed amount of bandwidth to each packet flow, while allowing it to also use additional bandwidth when available. In such a system, each packet is considered as "in-profile" if it conforms to the committed bandwidth or "out-of-profile" if it is outside of the committed bandwidth. The packet's profile state (i.e., in-profile or out-of-profile status) is one type of quality-of-service (QoS) information that can be marked in a packet header. This profile-state marking can be used downstream if congestion is encountered so that out-of-profile packets may be discarded, thereby ensuring that the committed bandwidth can be achieved end-to-end.

In existing systems, a separate circuit is used to measure the rate at which a packet queue is being granted by the scheduler, and to mark bits in the packet headers according to the queue's committed rate. Since a circuit is required for each packet queue, such a profile-marking system may be quite expensive to implement.

Alternatively, in a network-processor based implementation, the queue rate measurement may be performed in the network-processor code. However, extra expense is still incurred in the form of extra computational cycles in the processor, thereby lowering the overall performance of the switch.

BRIEF SUMMARY

Embodiments of the present invention provide an alternative method and system for marking the profile-state of a packet.

One embodiment provides a method of scheduling and marking packets at a communications node. The method provides a number of priority groups of queues containing packets to be transmitted from the node, in which a first of the priority groups contains packets at a higher priority level than packets in a second of the priority groups. One or more packet queues are configured to have two associated flow traffic descriptors (FTD) representing a first traffic rate and a second traffic rate for each associated queue. Each FTD is provided to one of a plurality of transmission scheduling queues, with each transmission scheduling queue having a transmission priority determined based on one or more priority rules. When a specific FTD becomes eligible for packet transmission, a packet is retrieved from a packet queue associated with the specific FTD. The packet is marked to indicate a profile state based on the traffic rate of the specific FTD, and the marked packet is transmitted.

Another embodiment provides a system for scheduling and marking a packet prior to transmission from a number of packet queues. The system includes a dual-rate scheduler having a calendar with a plurality of timeslots. The dual-rate scheduler is configured for allocating flow traffic descriptors (FTDs) to at least some of the plurality of timeslots, moving a FTD from a current timeslot to one of a number of FTD queues, and prioritizing the number of FTD queues for scheduling packet transmissions from the number of packet queues. One or more packet queues each has two associated FTDs representing two different traffic rates for the packet queue. The dual-rate scheduler is further configured to retrieve a packet from one of the packet queues when a specific FTD associated with the one packet queue becomes eligible for packet transmission, and to mark the packet to indicate a profile state based on the traffic rate of the specific FTD.

BRIEF DESCRIPTIONS OF THE FIGURES

Some embodiments can be readily understood by considering the following Detailed Description of Illustrative Embodiments in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Embodiments of the invention provide a method and a system for marking the profile state of a packet and scheduling the packet for transmission at a communication node. The profile marking of the packet is performed by a packet scheduler as a part of the scheduling function. Unlike existing methods of profile state marking—which requires determining a packet's profile state by measuring a queue rate using a dedicated circuit for each queue, updating the queue rate before each packet is transmitted, and comparing the updated queue rate to the committed bandwidth, embodiments of the invention do not require any measuring or updating of the queue rate for determining the packet's profile state.

Figure 1A:
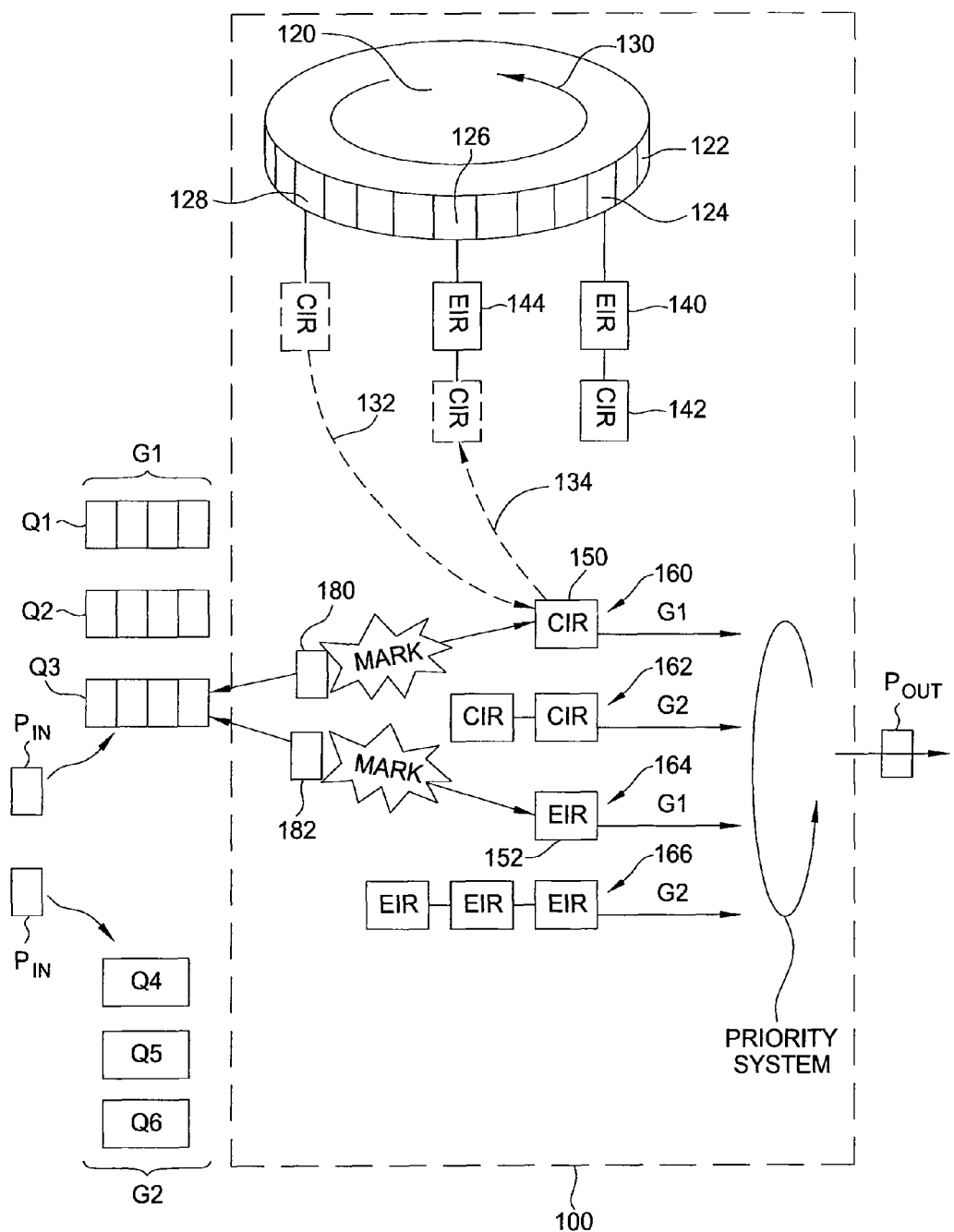
FIG. 1A is a schematic illustration of the scheduling and marking of packets according to one embodiment of the invention.

FIG. 1A is a schematic diagram illustrating one embodiment of the present invention for packet scheduling and marking using a packet scheduler 100 in a communications node. Packets ($P_{in}$) waiting for transmission are provided to a number of queues (also referred to as "packet queues"), Q1, Q2, Q3, Q4, Q5 and Q6, according to the priority designations of the packets. In this example, the queues Q1-Q6 are divided into two groups, G1 and G2, with one group G1 containing packets having a higher priority level than packets in the group G2. The priority level may be based on the nature of the information carried by the packets. For example, packets in the group G1 may carry traffic that has a low tolerance to data loss or delay than packets in the second group G2. For example, packets in group G1 may carry voice traffic, signaling and network management traffic, and packets in group G2 may carry traffic associated with internet access. Thus, group G1 may be designated for expedited handling, while group G2 may be designated for best effort handling.

In one embodiment, the packet scheduler 100 is a dual-rate scheduler that includes a scheduling calendar or calendar wheel 120. The dual-rate scheduler 100 is configured to control the scheduling and transmission of packets from packet queues Q1-Q6 at two different traffic rates, while the calendar 120 serves as a clock for use in the scheduling function.

Each packet queue has two associated "flow traffic descriptors" (FTDs) representing two traffic rates at which the packets from that queue can be transmitted. For example, a first or primary FTD is scheduled at a high priority to provide its associated queue the committed bandwidth or committed information rate (CIR), while a second or secondary FTD is scheduled at a low priority to give its associated queue access to excess bandwidth, if available, so that packets may also be transmitted at an excess information rate (EIR). The two FTDs associated with each packet queue may also be referred to as the CIR FTD and EIR FTD, respectively. As will be shown below, a FTD associated with a packet queue effectively serves as a placeholder for use in the dual-rate scheduler 100 for scheduling the transmission of packets from that queue at the respective traffic rate represented by the FTD.

FIG. 1A shows the calendar wheel 120 with a number of timeslots 122, 124, 126, 128, and so on, with each timeslot representing a certain time period for scheduling packet transmission. Each FTD is allocated to a timeslot in accordance with a prescribed traffic rate for the queue associated with that FTD. One timeslot may accommodate one FTD (e.g., FTD 144) or more than one FTDs (e.g., FTDs 140, 142) from the same or different packet queues. An arrow 130 illustrates the direction of advancement of time slots in the calendar wheel 120. For example, if timeslot 128 corresponds to a current time, then slots 122, 124 and 126 each represents a future time period.

As a FTD in a given timeslot advances to the current time, the FTD is removed from the calendar wheel 120 and put into one of a number of queues of FTDs, e.g., FTD queues 160, 162, 164 and 166. These FTD queues are used for scheduling packets for transmission, with each FTD essentially serving as a placeholder for the packets from its associated queue. These FTD queues may also be referred to as transmission scheduling queues. This is illustrated in FIG. 1A by the FTD 150, which is a CIR FTD associated with the packet queue Q3. In this example, it is assumed that the timeslot 128 corresponds to the current time. The CIR FTD 150 is then moved from the calendar wheel 120 to the FTD queue 160, as indicated by the dotted CIR box and the arrow 132.

Each FTD queue is characterized or defined by the traffic rates (e.g., CIR or EIR) of the FTDs in the queue, as well as the priority groups (e.g., G1 or G2) of the packet queues associated with the FTDs. That is, all FTDs having the same traffic rate and the same priority group belong to one FTD queue. Thus, queue 160 contains only CIR FTDs that are associated with a packet queue in the priority group G1, while queue 162 contains only CIR FTDs that are associated with a packet queue in the priority group G2.

Since only one packet can be transmitted at any given time from the system (as shown by the packet $P_{out}$ exiting the scheduler 100 in FIG. 1A), the FTD queues 160, 162, 164 and 166 have a hierarchy of transmission priorities for determining the order of packet transmission. In one embodiment, the priority level of each FTD queue is assigned based on the traffic rate of the FTDs in the queues, followed by the priority group of the packet queues associated with the FTDs.

Thus, as shown in FIG. 1A, the queue 160 containing CIR FTDs is given a higher priority than the queue 164 containing EIR FTDs. Although queues 160 and 162 both contain CIR FTDs, queue 160 has FTDs associated with a higher priority group (G1) of packet queues, and is thus given a higher priority for packet transmission compared to queue 162, whose FTDs are associated with the lower priority group (G2). Queue 164, which contains FTDs associated with packet queues from priority group G1, has a higher priority than queue 166, whose FTDs are associated with packet queues from priority group G2.

In one embodiment, the FTD queues 160, 162, 164 and 166 are serviced, or scheduled for packet transmission, by the dual-rate scheduler 100 according to a strict priority system, namely, that the FTD queues will be serviced for packet transmission according to the hierarchy of the FTD queues. Thus, queue 160 will be serviced before queues 162, 164 and 166, while queue 166 will be serviced only if there is no FTD in any of the queues 160, 162 and 164 (each having a higher priority level than queue 166).

When a specific FTD in a FTD queue becomes eligible for packet transmission, i.e., the specific FTD is the first in line in a queue having the highest priority among all non-empty queues, a packet is retrieved from the packet queue associated with that specific FTD. The profile state for that packet is then marked according to the traffic rate represented by that FTD prior to transmission.

This can be understood by referring to the FTD 150, which is associated with queue Q3 in this example. As shown in FIG. 1A, FTD 150 is eligible to be serviced by the scheduler 100 because it is first in line in the highest priority queue 160. Thus, a first packet 180 in packet queue Q3 is retrieved from the queue for transmission.

Prior to transmission, profile marking of packet 180 is done by the dual-rate scheduler 100 based on the traffic rate of the FTD 150. Since the FTD 150 is a CIR FTD, the packet is marked as "in profile". In this combined marking and scheduling method of the present invention, there is no need to perform any queue rate measurements for the packet queue Q3 in order to determine the profile state of packet 180. Instead, the packet profile is automatically determined by the traffic rate of the specific FTD 150 associated with the packet queue Q3 to which packet 180 belongs. After marking the packet header to indicate its profile state, the packet 180 is transmitted.

As a further illustration, FTD 152 is the EIR FTD associated with the packet queue Q3. When FTD 152 becomes eligible to be serviced for packet transmission, e.g., there are no FTDs waiting in queues 160 or 162, the first packet 182 in queue Q3 will be retrieved and marked as out-of-profile, as consistent with the EIR traffic rate of FTD 152.

The packet marking is generally done by a component in the scheduler 100 that processes the packets for transmission. In performing the scheduling function, that component will take a specific FTD from a FTD queue, reference back to the packet queue associated with the FTD, and retrieve a packet from the head of that queue. The marking can be done via software or hardware, and the component may correspond to a program in a network processor or a circuit in the scheduler 100.

The marking of a packet can be implemented in different manners. In one example, each packet in its respective packet queue is initially provided with a known marking, e.g., in-profile, as a default. This initial marking may be done prior to the packets' joining the packet queues Q1-Q6, or at other appropriate times, e.g., when creating or updating a packet header, depending on the specific implementation. If the secondary FTD, e.g., the EIR FTD, is used to schedule a packet from a packet queue for transmission, then the default in-profile marking is over-written or re-marked as out-of-profile by the scheduler 100 prior to the transmission of that packet.

Thus, if the packets are given an initial or default marking of an in-profile state prior to being scheduled for transmission, all packets that are scheduled for transmission as a part of the EIR will have to be marked as out-of-profile, i.e., re-mark the profile state from in-profile to out-of-profile.

However, packets to be transmitted as part of the CIR will not have to be marked (or re-marked) prior to transmission. In other words, for any packet that has a default profile state marking, it is necessary to re-mark that packet only if its default profile state is inconsistent with the traffic rate of the specific FTD being used to schedule the packet's transmission. For certain applications, it may be desirable to count the packets that have been re-marked, e.g., to establish a record of the number of in-profile versus out-of-profile packets.

In the example of FIG. 1A, each packet queue has associated with it a CIR FTD and an EIR FTD for use in scheduling and marking the profile states of corresponding packets. In general, the scheduler 100 of the present invention is configured for handling packet scheduling from a number of queues with different traffic flow combinations, and the packets in different queues may require a different profile marking procedure.

Figure 1B:
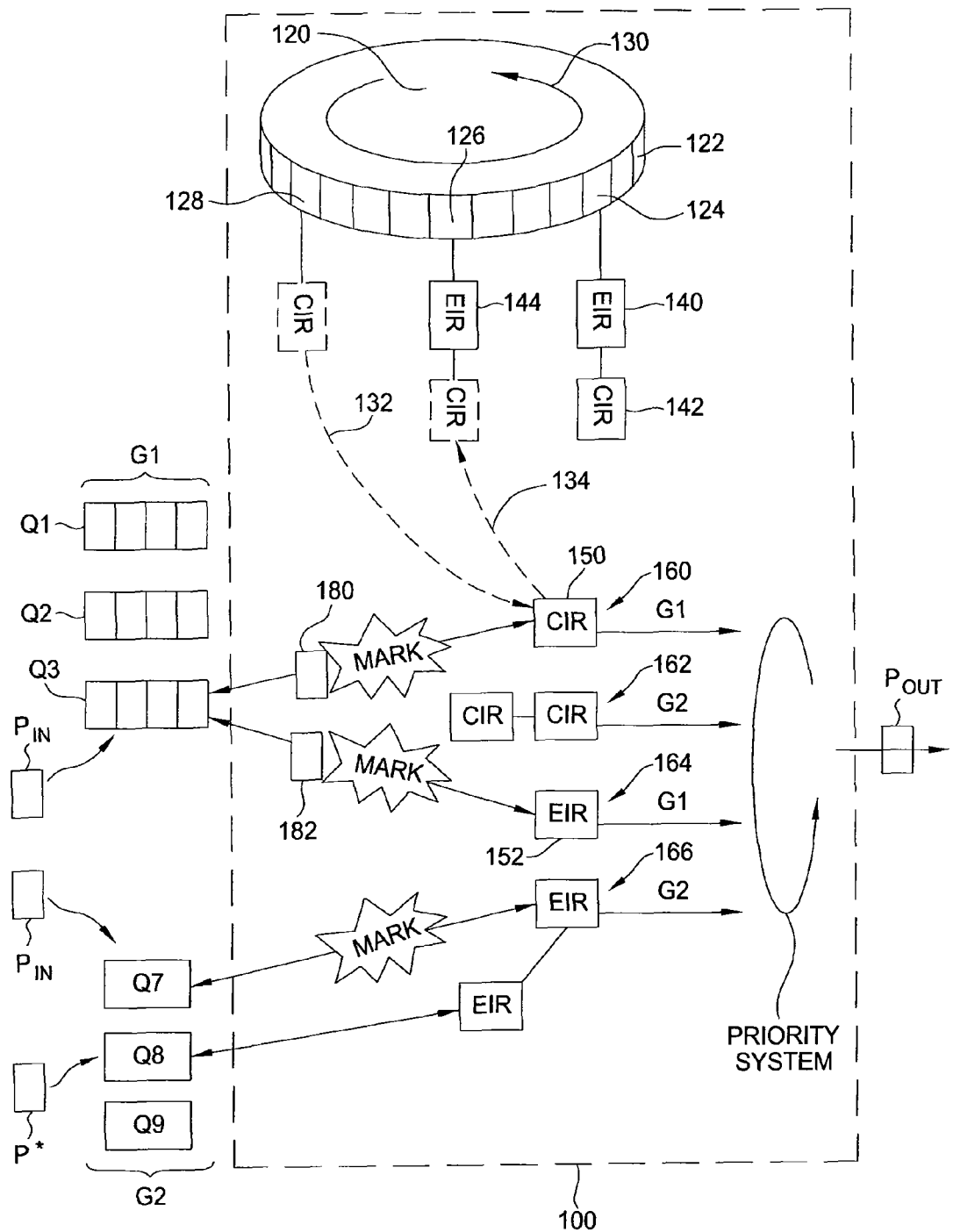
FIG. 1B is a schematic illustration of the scheduling and marking of packets according to another embodiment of the invention.

This is illustrated in FIG. 1B, in which one or more packet queues have associated CIR FTDs and EIR FTDs for scheduling packet transmissions as previously described, e.g., queue Q3. At least one other packet queue, e.g., queue Q7, may have a traffic flow bandwidth characterized only by a single traffic rate such as CIR (when the available bandwidth is all committed) or EIR (when none of the available bandwidth is committed). In that case, profile marking for queue Q7 can be done on a "per packet queue" basis. That is, the packet queue Q7 is configured (or instructed) so that all packets to be transmitted from that queue will be marked with the same profile state. This "queue marking" can be implemented by initializing the profile state for all packets in queue Q7 to in-profile when all available bandwidth for the queue is committed, or out-of-profile when none of the available bandwidth is committed.

For the "queue marking" mode, there will only be one FTD, e.g., either a CIR-FTD or an EIR-FTD, used for scheduling packet transmissions from that queue. As an example, queue Q7 is illustrated in FIG. 1B as being marked by its associated EIR FTD. This queue marking mode may be applied to one or more of the packet queues. Again, the packet marking can be done by a component in the scheduler 100 based on the FTD for the queue. Alternatively, the packets in queue Q7 can be initialized with the correct profile state, in which case, there will not be a need to perform profile marking based on the FTD.

The initialization of the profile state can generally be done either by a component in the scheduler 100, or by an upstream device, e.g., another packet-processing component in the same node as the scheduler. If the packets have already been initialized by an upstream device to the correct profile state, all that needs to be done in the scheduler 100 is to maintain the existing profile state marking of each of these packets. This is illustrated in FIG. 1B by queue Q8, with a packet P* that has already been marked with the correct state by a device upstream of the scheduler 100. In this case, P* does not have to be re-marked by the scheduler 100, although the appropriate FTD (i.e., corresponding to the profile state of P*) associated with queue Q8 is still used for scheduling transmission of the packet.

Once a packet has been transmitted, the FTD associated with the queue of that transmitted packet will be returned to the calendar wheel. This is illustrated in FIG. 1A by a dotted arrow 134 and a dotted box labeled CIR, representing the return of FTD 150 to a future timeslot 126 on the calendar wheel 120 after the transmission of packet 180 from the node. The allocation of FTD 150 to slot 126 is determined, to a large extent, by the committed bandwidth for queue Q3. In one example, in order to provide a CIR of 100 packets per second, the "returning" CIR FTD 150 will be allocated to a timeslot 126 that is approximately 10 millisecond after the last allocated timeslot 128 (i.e., a time interval about equal to the inverse of the CIR). It is understood that other variations in the implementation are also be possible, depending on specific system engineering considerations.

Figure 2:
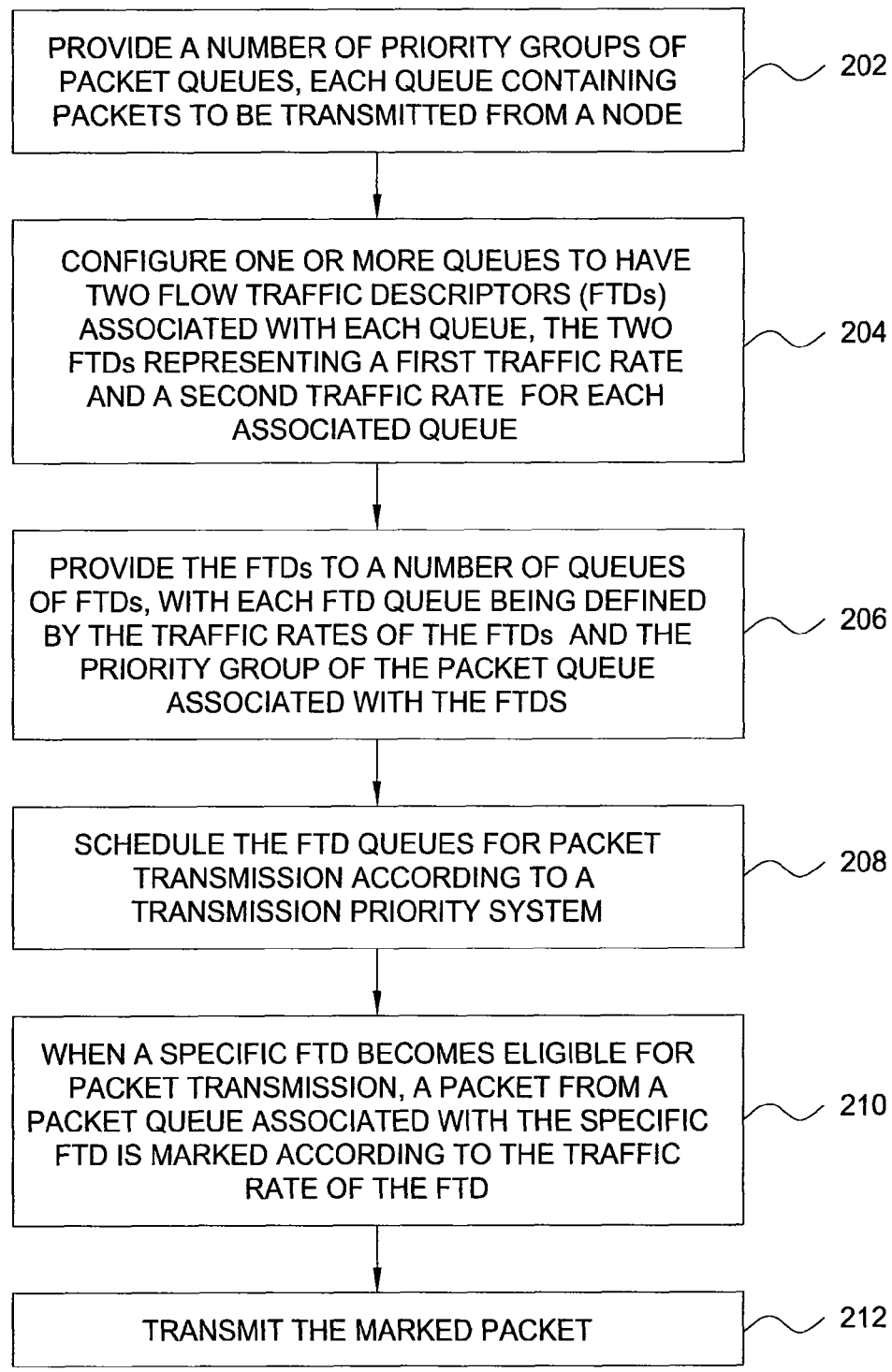
FIG. 2 is a schematic representation of a method for implementing one embodiment of the invention.

FIG. 2 illustrates a method 200 for implementing one embodiment of the present invention. In block 202, a number of priority groups of queues are provided, with each queue containing packets to be transmitted from a node. A first priority group contains traffic or packets having a higher priority than traffic in the second priority group. As shown in block 204, one or more packet queues is configured to have two flow traffic descriptors (FTDs) associated with each queue, the two FTDs representing a first traffic rate and a second traffic rate. In one example, the first traffic rate may correspond to a CIR and the second traffic rate may correspond to an EIR. In block 206, the FTDs are provided to one of a number of queues of FTDs, e.g., by first allocating the FTDs to time slots in a scheduling calendar, and then moving a FTD from a current time slot to one of the FTD queues. Each FTD queue is defined by the traffic rates of the FTDs and the priority group associated with the FTDs.

As shown in block 208, the queues of FTDs are serviced according to a transmission priority system, e.g., a strict priority system, for scheduling packet transmissions. In block 210, when a specific FTD in a FTD queue becomes eligible for packet transmission (i.e., the specific FTD is the first in line in a queue with the highest priority among all non-empty queues), a packet from a queue associated with the specific FTD is retrieved and marked to indicate its profile state according to the traffic rate of the specific FTD. In block 212, the marked packet is transmitted.

Embodiments of the invention allow profile marking of packets to be combined with the scheduling mechanism, without the need for any queue rate measurement or update for each packet queue, thus eliminating the need for any queue rate measurement circuits. In the case of a network-processor based implementation (i.e., software implementation), embodiments of the invention will also result in a higher performance.

While the foregoing is directed to some embodiments, other and further embodiments may be devised without departing from the basic scope thereof, and the scope thereof is determined by the claims that follow.

The invention claimed is:

1. A method of processing packets at a communications node, comprising:
   providing a number of priority groups of packet queues containing packets to be transmitted from the node, wherein a first of the priority groups contains packets at a higher priority level than packets in a second of the priority groups;
   configuring one or more packet queues with two associated flow traffic descriptors (FTDs) representing a first traffic rate and a second traffic rate for each associated queue;
   providing each FTD to one of a plurality of transmission scheduling queues, each transmission scheduling queue having a transmission priority based on one or more priority rules;
   when a specific FTD becomes eligible for packet transmission during a defined time slot, retrieving one or more packets associated with the specified FTD from a packet queue associated with the specific FTD and marking the one or more packets to indicate a profile state based on the traffic rate of the specific FTD;

transmitting during the defined time slot, the one or more marked packets associated with the specified FTD; and
providing each packet in the one or more packet queues with a default profile state; wherein the default profile state is selected to be consistent with an available bandwidth of the respective packet queue.

2. The method of claim 1, wherein the first traffic rate corresponds to a committed information rate (CIR) and the second traffic rate corresponds to an excess information rate (EIR).

3. The method of claim 2, wherein packets are marked as in-profile when the traffic rate of the specific FTD is CIR, and packets are marked as out-of-profile when the traffic rate of the specific FTD is EIR.

4. The method of claim 1, further comprising providing each packet in the one or more packet queues with a default profile state when each packet is added to the one or more packet queues.

5. The method of claim 4, further comprising marking the packet being scheduled for transmission based on the traffic rate of the specific FTD only if the default profile state of the packet is inconsistent with the traffic rate of the specific FTD.

6. The method of claim 1, wherein the marking of the packet to indicate the profile state is implemented via software using a network processor.

7. The method of claim 1, wherein the marking of the packet to indicate the profile state is implemented via hardware using a packet scheduler.

8. The method of claim 1, wherein the FTDs are provided to respective transmission scheduling queues by:
allocating the FTDs to future time slots in a scheduling calendar; and
moving a FTD from a current time slot in the calendar to one of the plurality of FTD queues.

9. The method of claim 1, further comprising:
providing at least one packet queue having a bandwidth characterized by a single traffic rate; and
marking all packets from the at least one packet queue based on the single traffic rate.

10. The method of claim 1, wherein each FTD queue is characterized by a traffic rate and a priority group associated with the FTDs in that queue.

11. The method of claim 10, wherein the one or more priority rules comprise determining the transmission priority based on the traffic rate of the FTDs in the FTD queue and the priority group associated with the FTDs.

12. The method of claim 1, wherein the first priority group corresponds to packets designated for expedited handling and the second priority group corresponds to packets designated for best effort handling.

13. The method of claim 1, further comprising:
scheduling the plurality of FTD queues for packet transmission according to a strict priority system.

14. The method of claim 13, wherein the strict priority system comprises assigning priority based on the traffic rate of the FTDs followed by the priority group associated with the FTDs.

15. A system for processing a packet prior to transmission from a number of packet queues, comprising:
a dual-rate scheduler having a calendar with a plurality of timeslots; the dual-rate scheduler configured for allocating flow traffic descriptors (FTDs) to at least some of the plurality of timeslots, moving a FTD from a current timeslot to one of a number of FTD queues, and prioritizing the number of FTD queues for scheduling packet transmissions from the number of packet queues;
wherein one or more packet queues each has two associated FTDs representing two different traffic rates for the packet queue;
the dual-rate scheduler is further configured to retrieve a packet from one of the packet queues when a specific FTD associated with the one packet queue becomes eligible for packet transmission during a defined time slot, and to mark the one or more packets to indicate a profile state based on the traffic rate of the specific FTD; and
the dual-rate scheduler is further configured for providing each packet in the one or more packet queues with a default profile state; wherein the default profile state is selected to be consistent with an available bandwidth of the respective packet queue.

16. The system of claim 15, wherein the first traffic rate corresponds to a committed information rate (CIR) and the second traffic rate corresponds to an excess information rate (EIR).

17. The system of claim 15, wherein packets are marked as in-profile when the traffic rate of the specific FTD is CIR, and packets are marked as out-of-profile when the traffic rate of the specific FTD is EIR.

18. The system of claim 15, further configured for providing each packet in the one or more packet queues with a default profile state when each packet is added to the one or more packet queues.

19. The system of claim 18, further configured for marking the packet being scheduled for transmission based on the traffic rate of the specific FTD only if the default profile state of the packet is inconsistent with the traffic rate of the specific FTD.

* * * * *